(12) United States Patent
Su (10) Patent No.: US 11,458,549 B2
(45) Date of Patent: Oct. 4, 2022

(54) DEBURRING CHAMFER TOOL

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

(*) Notice: Subject to any disclaimer, the term of this patent is extended or adjusted under 35 U.S.C. 154(b) by 0 days.

(21) Appl. No.: 17/186,187

(22) Filed: Feb. 26, 2021

(65) Prior Publication Data

US 2021/0370418 A1 Dec. 2, 2021

(30) Foreign Application Priority Data

May 28, 2020 (TW) .................................. 109117910

(51) Int. Cl.
 *B23B 51/10* (2006.01)

(52) U.S. Cl.
 CPC .......... *B23B 51/101* (2013.01); *B23B 51/103* (2013.01)

(58) Field of Classification Search
 CPC ................ B23B 51/101; B23B 51/103; B23B 2251/204; B23B 2265/08; B23B 2251/208
 See application file for complete search history.

(56) References Cited

U.S. PATENT DOCUMENTS

| 9,782,844 B2 | 10/2017 | Ogata |
| 10,239,231 B2 | 3/2019 | Fujita |
| 10,293,410 B2* | 5/2019 | Yu ........................... B23B 5/167 |
| 2019/0143418 A1* | 5/2019 | Su ........................... B23B 5/167 408/229 |

FOREIGN PATENT DOCUMENTS

| CN | 201871786 U | 6/2011 |
| CN | 203679305 U | 7/2014 |
| CN | 204770729 U | 11/2015 |
| CN | 206028903 U | 3/2017 |
| CN | 207746452 U | 8/2018 |
| CN | 208825653 U | 5/2019 |
| TW | M269983 U | 7/2005 |

* cited by examiner

*Primary Examiner* — Boyer D Ashley
*Assistant Examiner* — Reinaldo A Vargas Del Rio
(74) *Attorney, Agent, or Firm* — Karin L. Williams; Alan D. Kamrath; Mayer & Williams PC (57) ABSTRACT

A deburring chamfer tool has a main body including a working end for engaging a workpiece to be deburred. The working end is of a conical shape and has a first and a second cutting edge respectively extending lengthwise with reference to different slant reference lines which delimit the conical shape. Each of the first and the second cutting edges slope from a first end adjacent to the vertex of the conical shape to a second end adjacent to the base of the conical shape in a first length and a second length respectively. The second length is smaller than the first length.

20 Claims, 8 Drawing Sheets

DEBURRING CHAMFER TOOL

BACKGROUND OF THE INVENTION

1. Field of the Invention

The present invention relates to a tool and, particularly, to a deburring chamfer tool.

2. Description of the Related Art

Taiwan Pat. No. M269983 discloses a deburring chamfer tool designed to remove burrs more efficiently and to alleviate cutting resistance. The deburring chamfer tool defines a single burr removal groove which is spiral and has a cutting head which includes concave shaped sides.

In contrast to a conventional deburring chamfer tool with multi cutting edges that suffers difficulties getting rid of burrs because gaps between adjacent cutting edges are small, the deburring chamfer tool adopts a cutting edge design which is single-edged. Unfortunately, a user can not cut burrs efficiently with the single-edged cutting edge.

The present invention is, therefore, intended to obviate or at least alleviate the problems encountered in the prior art.

SUMMARY OF THE INVENTION

According to the present invention, a deburring chamfer tool, which is operably rotated about an axis of rotation, has a main body including a working end for engaging a workpiece to be deburred. The working end is of a conical shape and has a first and a second cutting edge respectively extending lengthwise with reference to two slant reference lines which delimit of the conical shape. Each of the first and the second cutting edges slope from a first end adjacent to the vertex of the conical shape to a second end adjacent to the base of the conical shape in a first length and a second length respectively. The second length is smaller than the first length.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

FIGS. 1 through 6 show a deburring chamfer tool 10 in accordance with a first embodiment of the present invention. A main body 20 of the deburring chamfer tool 10 includes a connecting end 21 adapted to be connected to a driving tool and a working end 22 for engaging a workpiece to be deburred.

The working end 22 is of a conical shape and has a first and a second cutting edge 23 and 24 respectively extending lengthwise along two slant reference lines Y which delimit the conical shape. The first and the second cutting edges 23 and 24 extend linearly. Each of the first and the second cutting edges 23 and 24 slopes from a first end 231 and 241 adjacent to the vertex of the conical shape to a second end 232 and 242 adjacent to the base of the conical shape in a first length L1 and a second length L2 respectively. The second length L2 is smaller than the first length L1. Each of the two reference lines Y is inclined to the axis of rotation C greater than 20 degrees and less than 60 degrees.

The working end 22 has a first and a second peripheral surface 221 and 222 constituting the conical shape. An edge of the first peripheral surface 221 defines the first cutting edge 23 and an edge of the second peripheral surface 222 defines the second cutting edge 24 respectively. The working end 22 has an indented surface 223 separating the first and the second peripheral surfaces 221 and 222 as well as the first and the second cutting edges 23 and 24.

The working end 22 has a first rib 25 and a surface of the first rib 25 defines the first peripheral surfaces 221. The working end 22 has a second rib 26 and a surface of the second rib 26 defines the second peripheral surface 222. The first rib 25 has a lateral surface 251 inclined to the first peripheral surface 221 and the second rib 26 has a lateral surface 261 inclined to the second peripheral surface 222 respectively. The first rib 25 includes the lateral surface 251 contiguous to the first cutting edge 23 and the second rib 26 includes the lateral surface 261 contiguous to the second cutting edge 24 respectively. The lateral surface 251 is inclined to the first peripheral surface 221 not greater than 90 degrees. The lateral surface 261 is inclined to the second peripheral surface 222 not greater than 90 degrees.

The working end 22 has at least one third peripheral surface 224 constituting the conical shape. The working end 22 has at least one third cutting edge 27 and an edge of the at least one third peripheral surface 224 defines the at least one third cutting edge 27. The at least one third cutting edge 27 slopes from a first end adjacent to the vertex of the conical shape to a second end adjacent to the base of the conical shape in a length longer than the second length L2. The indented surface 223 separates at least one third and the second peripheral surfaces 224 and 222 as well as the at least one third and the second cutting edges 23 and 24. The second cutting edge 24 is situated between the first and the at least one third cutting edges 23 and 27 circumferentially. The first and the at least one third cutting edges 23 and 27 are of the same length.

The working end 22 has at least one third rib 29 and a surface of the at least one third rib 29 defines the at least one third peripheral surface 224. The at least one third rib 29 has a lateral surface 291 inclined to the at least one third peripheral surface 224. The at least one third rib 29 includes the lateral surface 291 contiguous to the at least one third cutting edge 27. The lateral surface 291 is inclined to the at least one third peripheral surface 224 not greater than 90 degrees.

The working end 22 has at least one fourth peripheral surfaces 225 constituting the conical shape. The working end 22 has at least one fourth cutting edge 28 and an edge of the at least one fourth peripheral surface 224 defines the at least one fourth cutting edge 28. The at least one fourth cutting edge 28 slopes from a first end adjacent to the vertex of the conical shape to a second end adjacent to the base of the conical shape in a length less than the length of the at least one third cutting edge 27. The at least one third and the at least one fourth cutting edges 27 and 28 are alternatively situated circumferentially. The working end 22 has an indented surface 226 separating the at least one third and the at least one fourth peripheral surfaces 224 and 225 as well as the at least one third and the at least one fourth cutting edges 27 and 28. The second and the at least one fourth cutting edges 24 and 28 are of the same length.

The working end 22 has at least one fourth rib 30 and a surface of the at least one fourth rib 30 defines the at least one fourth peripheral surface 225. The at least one fourth rib 30 has a lateral surface 301 inclined to the at least one fourth peripheral surface 225. The at least one fourth rib 30 includes the lateral surface 301 contiguous to the at least one fourth cutting edge 28. The lateral surface 301 is inclined to the at least one fourth peripheral surface 225 not greater than 90 degrees.

Figure 1:
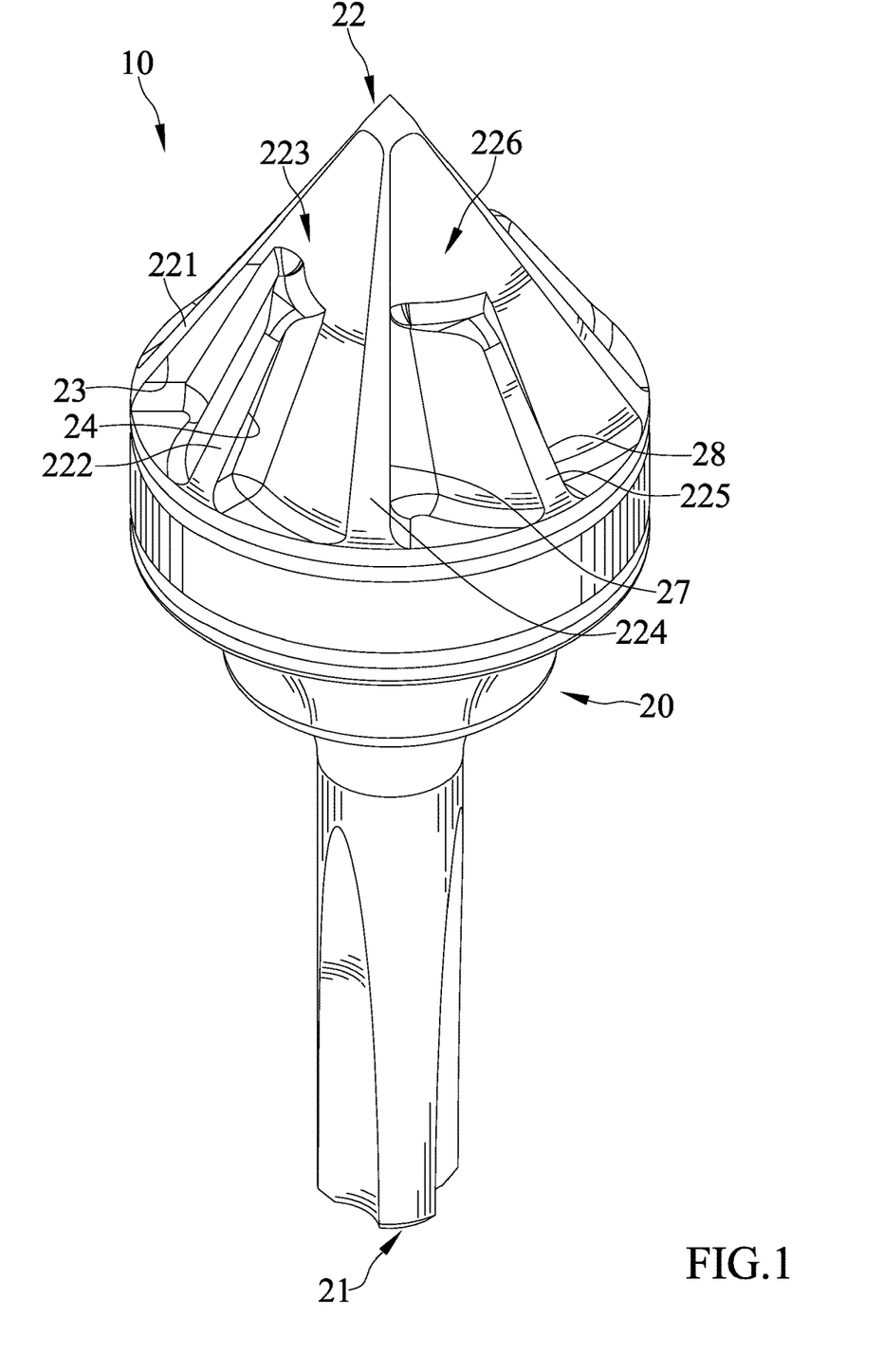
FIG. 1 is a perspective view of a deburring chamfer tool in accordance with a first embodiment of the present invention.
Figure 2:
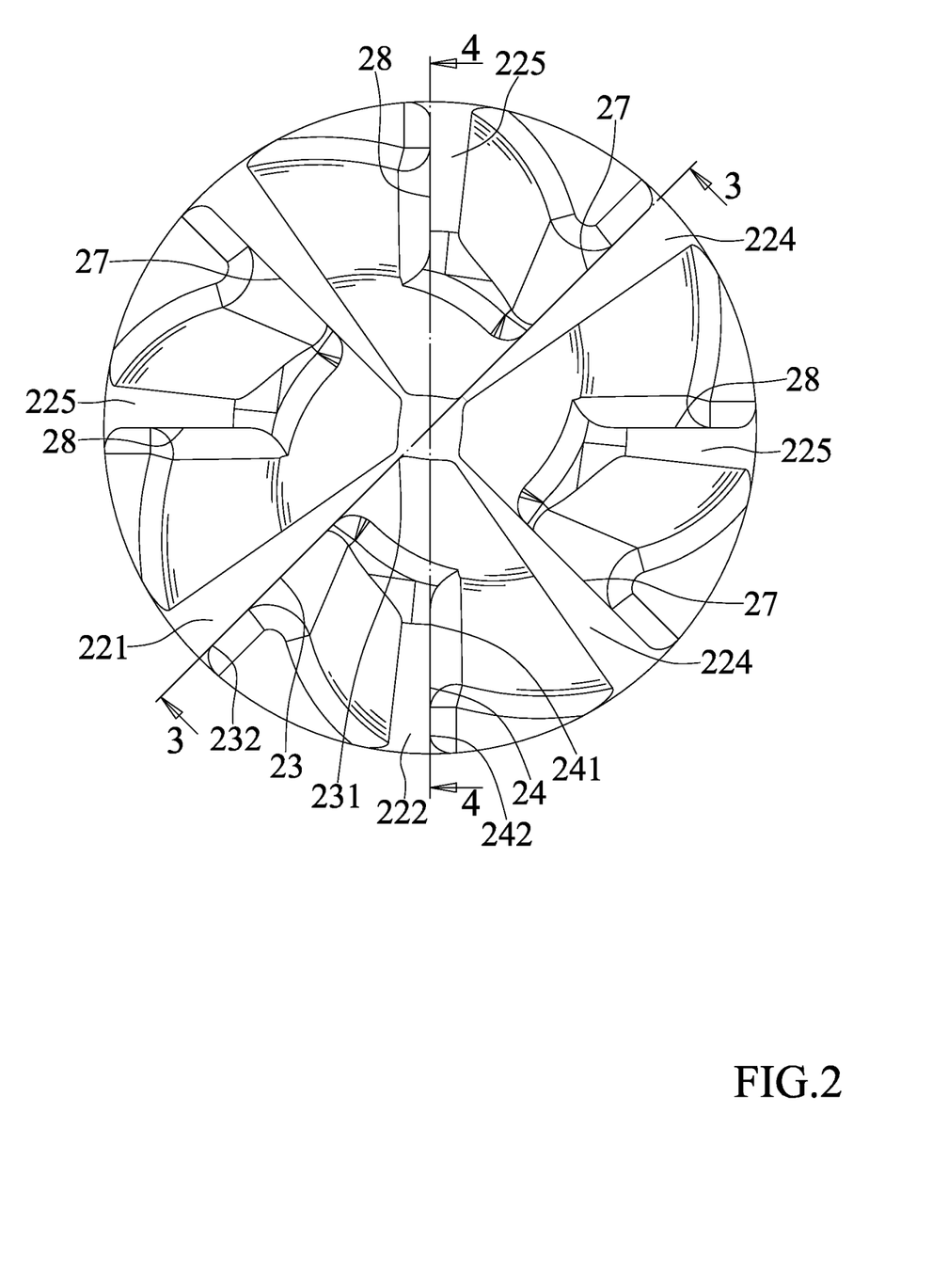
FIG. 2 is a top view of FIG. 1.
Figure 3:
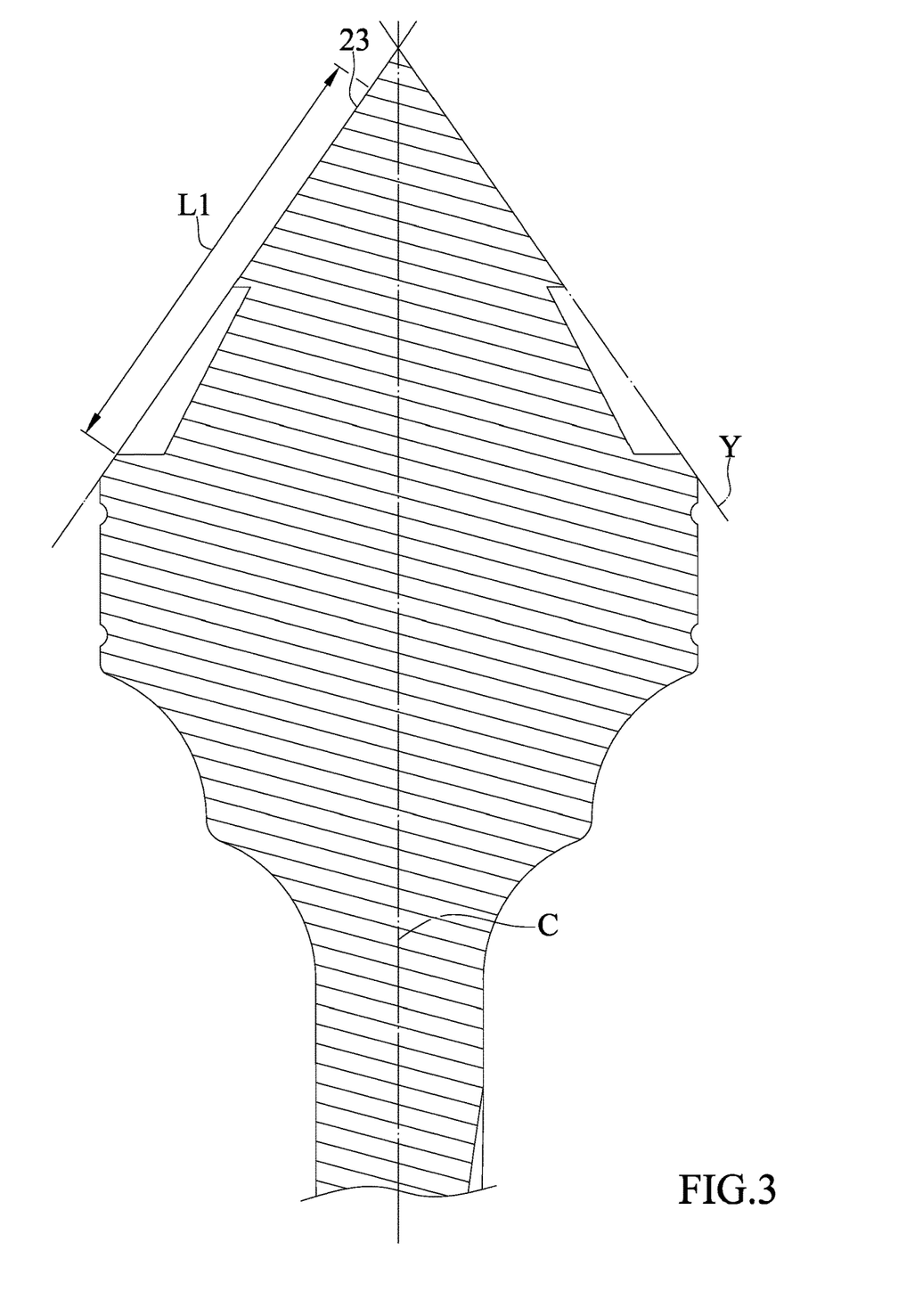
FIG. 3 is a cross-sectional view taken along line 3-3 of FIG. 2.
Figure 4:
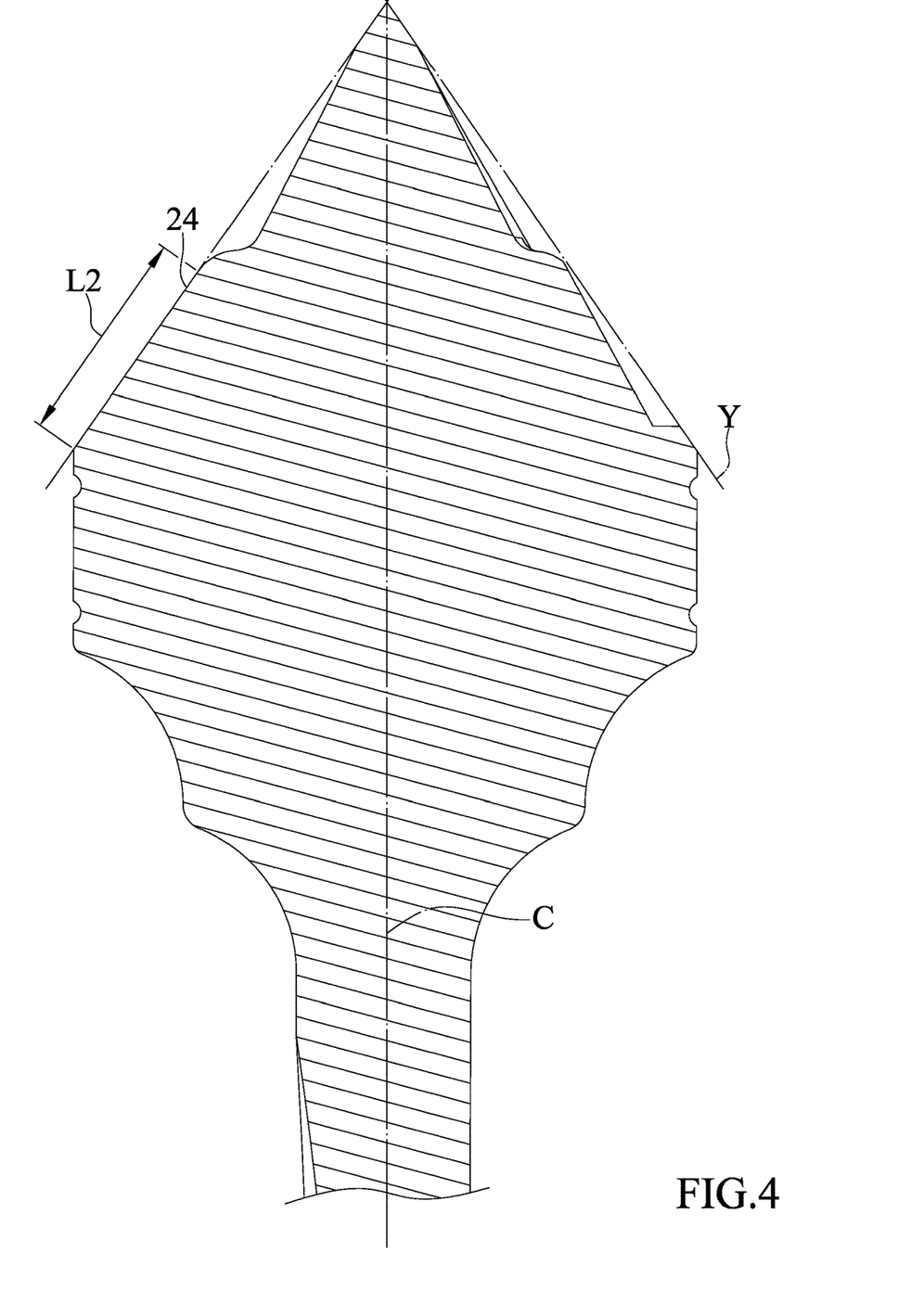
FIG. 4 is a cross-sectional view taken along line 4-4 of FIG. 2.
Figure 5:
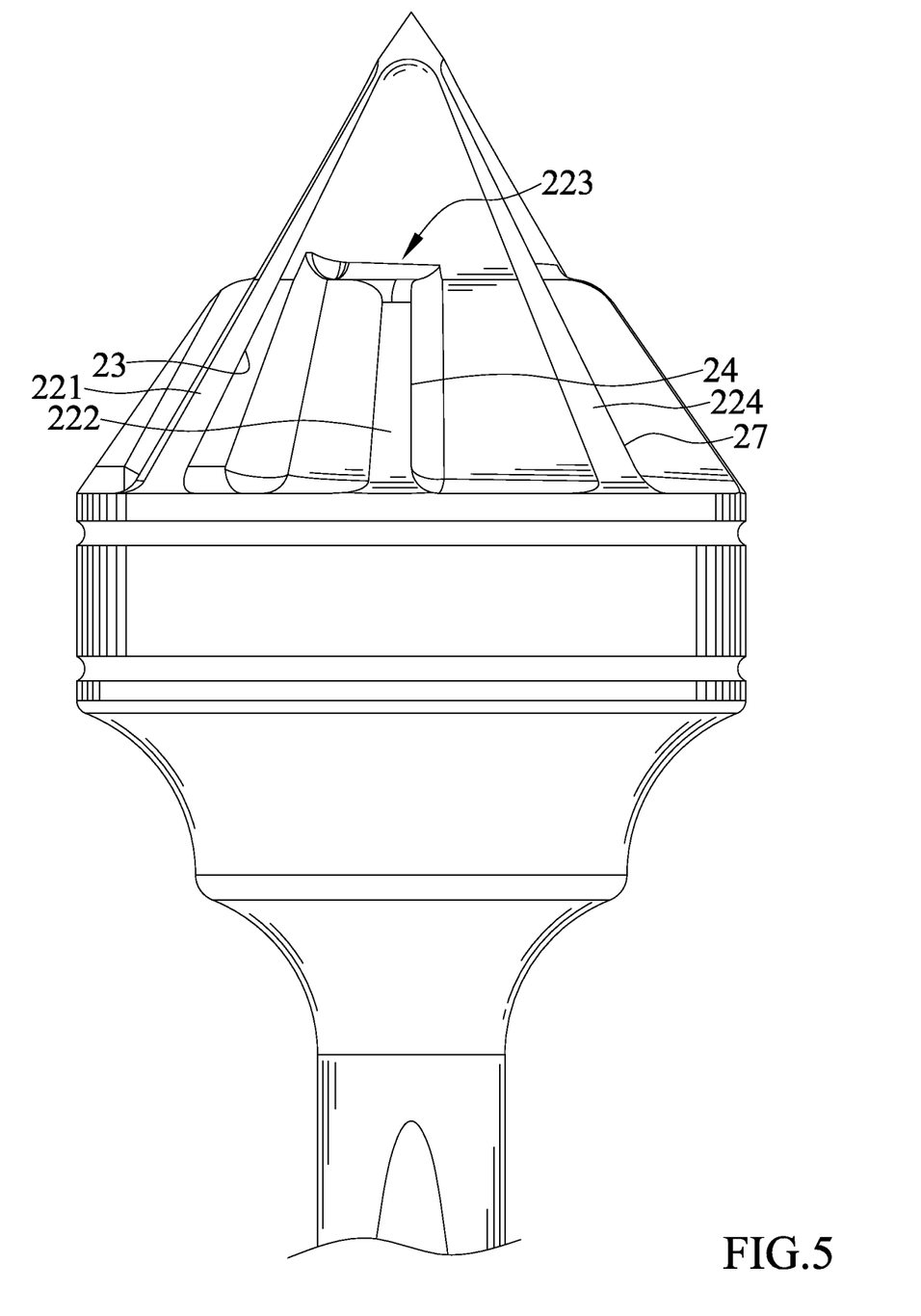
FIG. 5 is a side view of FIG. 1.
Figure 6:
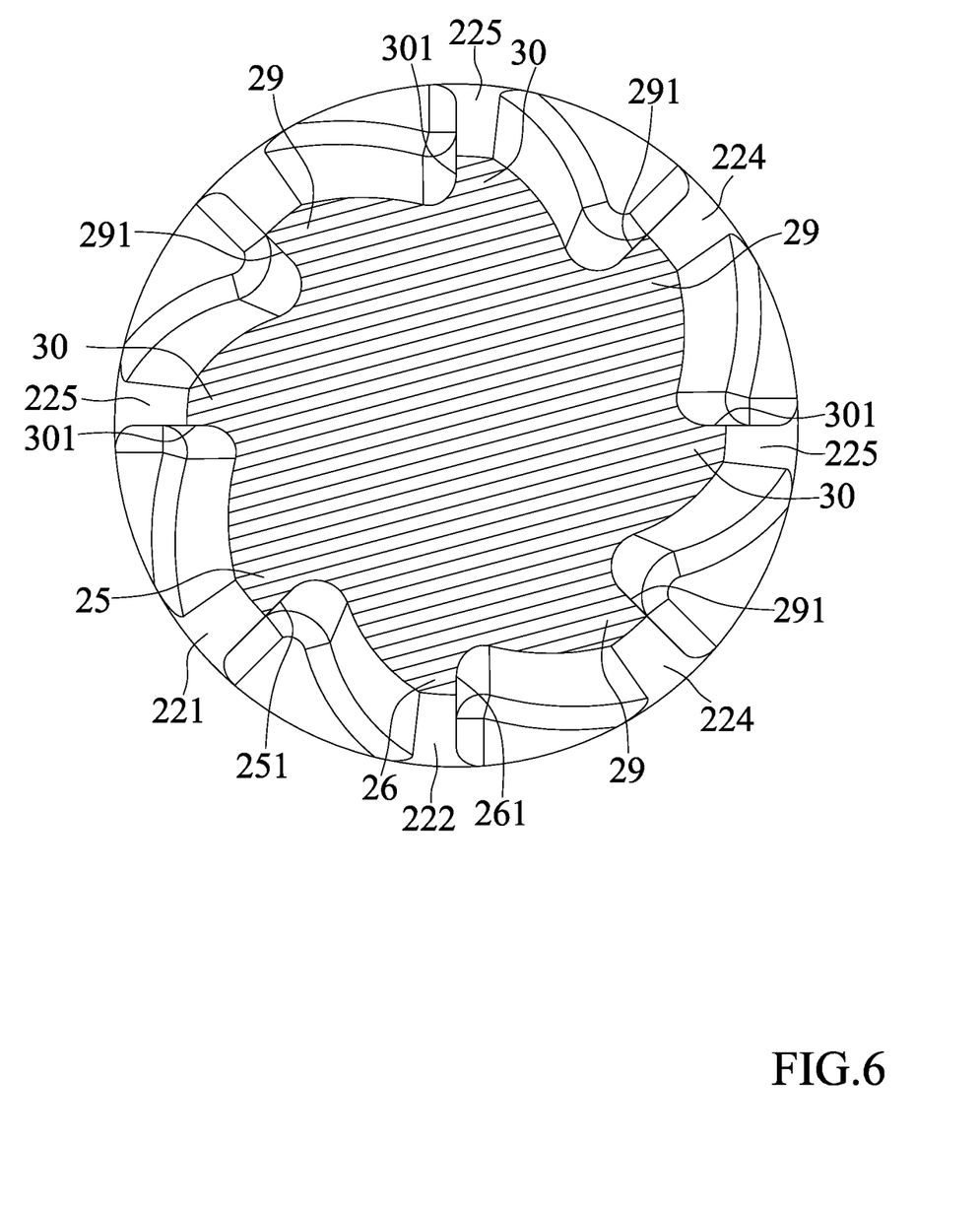
FIG. 6 is a cross-sectional view of FIG. 1.
Figure 7:
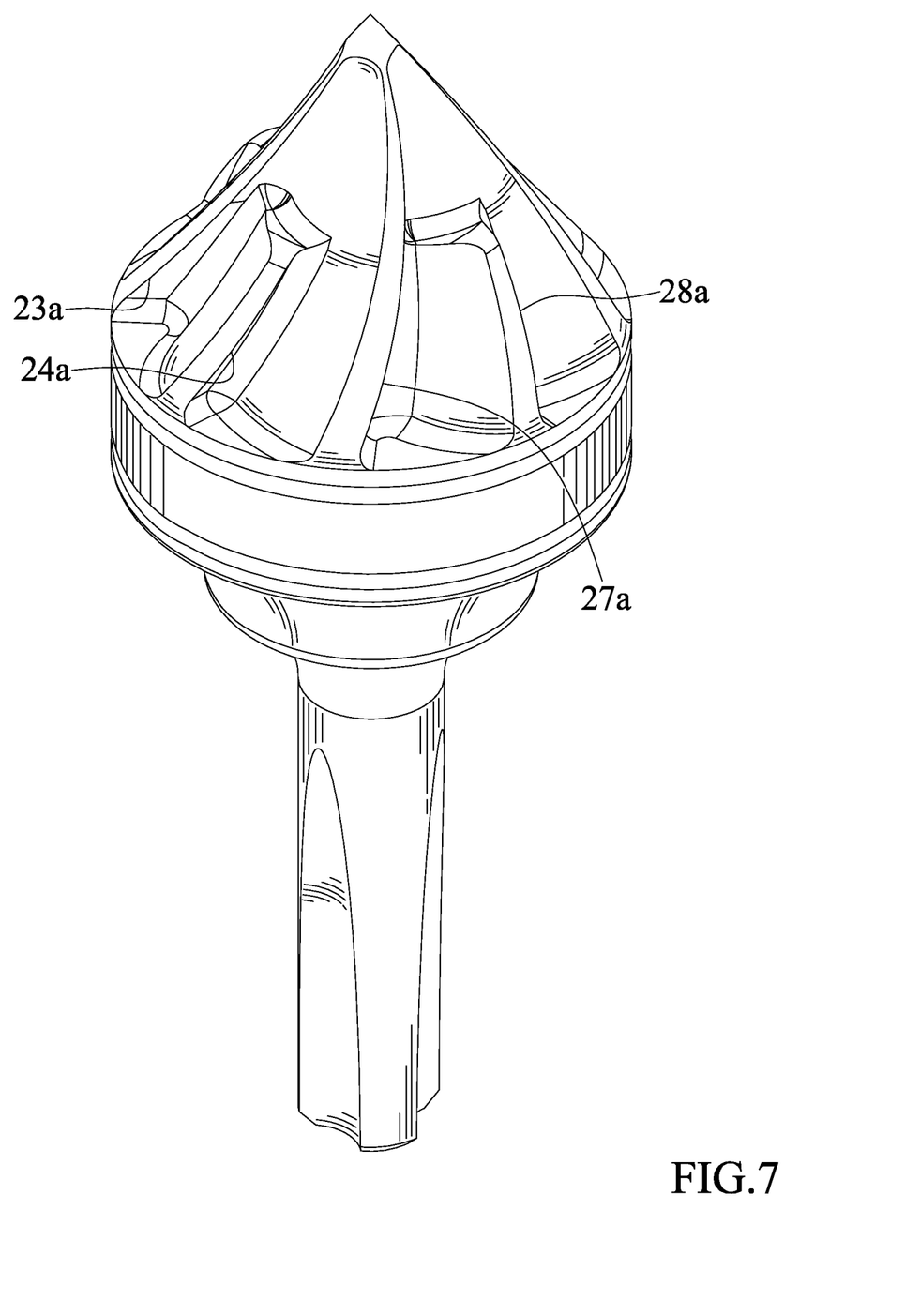
FIG. 7 is a perspective view of a deburring chamfer tool in accordance with a second embodiment of the present invention.
Figure 8:
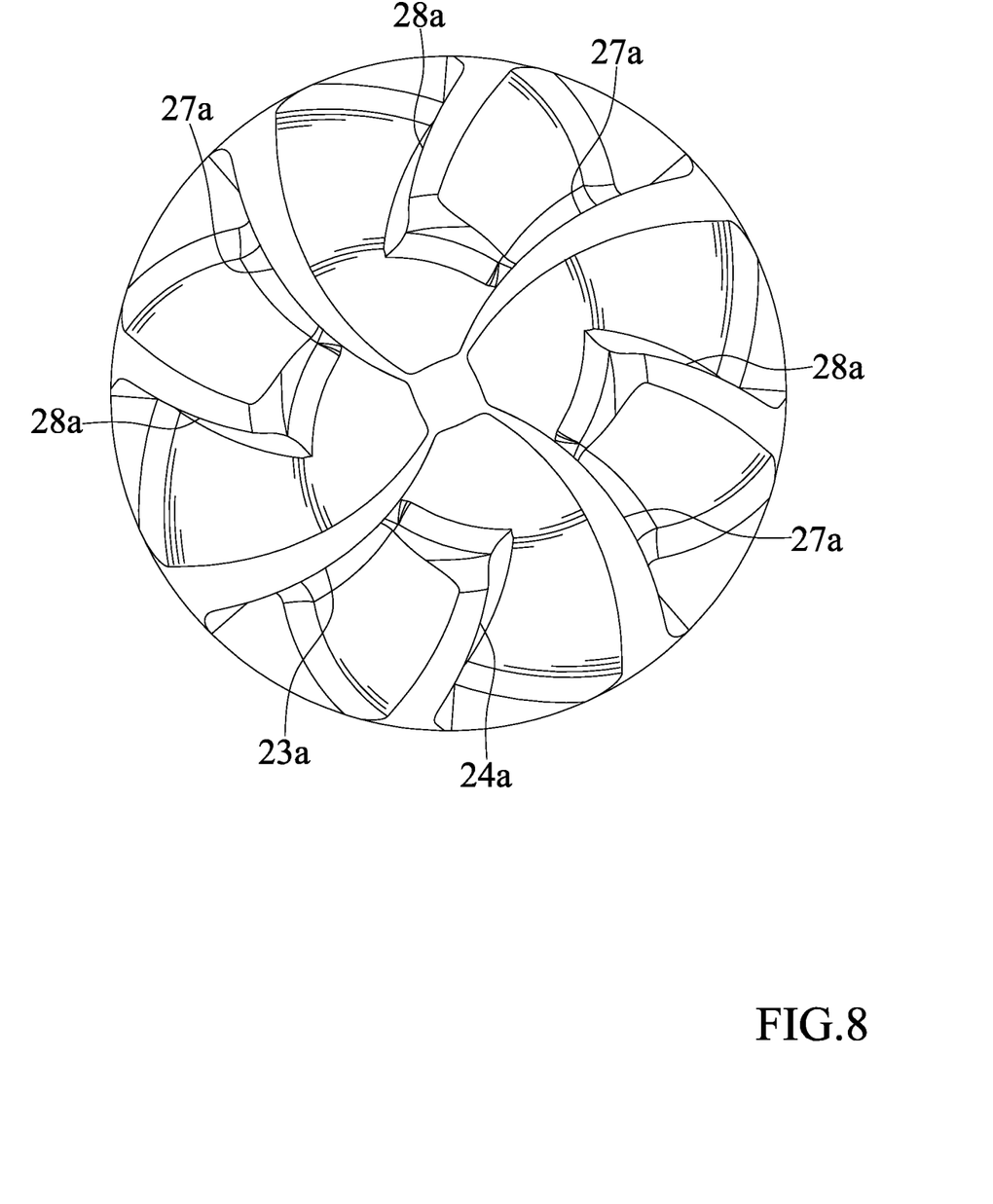
FIG. 8 is a top view of FIG. 7.

FIGS. 7 and 8 show a deburring chamfer tool in accordance with a second embodiment of the present invention, and the same numbers are used to correlate similar components of the first embodiment, but bearing a letter a. Similarly, the deburring chamfer tool has a first cutting edge 23a, a second cutting edge 24a, at least one third cutting edge 27a, and at least one fourth cutting edge 28a. Each of the first and the second cutting edges 23a and 24a slopes from a first end adjacent to the vertex of the conical shape to a second end adjacent to the base of the conical shape. The at least one third cutting edge 27a slopes from a first end adjacent to the vertex of the conical shape to a second end adjacent to the base of the conical shape in a length longer than the length L2 of the second cutting edge 23a. The second cutting edge 24a is situated between the first and the at least one third cutting edges 23a and 27a circumferentially. The at least one fourth cutting edge 28a slopes from a first end adjacent to the vertex of the conical shape to a second end adjacent to the base of the conical shape in a length less than the length of the at least one third cutting edge 27a. The at least one third and the at least one fourth cutting edges 27a and 28a are alternatively situated circumferentially. The length of the second cutting edge 24a is smaller than the length of the first cutting edge 23a. The technology of the first and the second embodiments are similar except that the first cutting edge 23a, the second cutting edge 24a, the at least one third cutting edge 27a, and the at least one fourth cutting edge 28a extend curvedly.

In view of the foregoing, the deburring chamfer tool 10 includes a plurality of cutting edges, which includes the cutting edges 23, 23a, 24, 24a, 27a, and 28a. Therefore, a user can use it to deburr a workpiece efficiently. Further, the ends 231 of the cutting edges 23, 23a, 27, and 27a are adjacent while the ends 241 of the cutting edges 24, 24a, 28, 28a are nonadjacent to the vertex of the working end 22, and the cutting edges 23, 23a, 27, and 27a are longer than the cutting edges 24, 24a, 28, 28a in length for allowing the deburring chamfer tool 10 to get rid of burrs efficiently.

The foregoing is merely illustrative of the principles of this invention and various modifications can be made by those skilled in the art without departing from the scope and spirit of the invention.

What is claimed is:

1. An internal deburring chamfer tool which is operably rotated about an axis of rotation, comprising:
    a main body including a working end for engaging a workpiece to be deburred, wherein the working end is of a conical shape and has a first cutting edge and a second cutting edge respectively extending lengthwise with reference to two slant reference lines which delimit the conical shape, wherein each of the first cutting edge and the second cutting edge slopes from a first end adjacent to the vertex of the conical shape to a second end adjacent to the base of the conical shape in a first length and a second length respectively, wherein the first end of the second cutting edge is further away from the vertex of the conical shape than the first end of the first cutting edge, and the second end of the first cutting edge and the second end of the second cutting edge are at substantially a same height of the conical shape,
    and wherein the second length is smaller than the first length, wherein the working end has a first and a second peripheral surface constituting an outer peripheral surface of the main body and an edge of the first peripheral surface defines the first cutting edge and an edge of the second peripheral surface defines the second cutting edge respectively.

2. The internal deburring chamfer tool as claimed in claim 1, wherein each of the two reference lines is inclined to the axis of rotation greater than 20 degrees and lesser than 60 degrees.

3. The internal deburring chamfer tool as claimed in claim 1, wherein the working end has a first indented surface separating the first and the second peripheral surfaces as well as the first and the second cutting edges.

4. The internal deburring chamfer tool as claimed in claim 3, wherein the working end has a first rib and a surface of the first rib defines the first peripheral surfaces, wherein the working end has a second rib and a surface of the second rib defines the second peripheral surface, wherein the first rib has a lateral surface inclined to the first peripheral surface and the second rib has a lateral surface inclined to the second peripheral surface respectively, and wherein the first rib includes the lateral surface thereof contiguous to the first cutting edge and the second rib includes the lateral surface thereof contiguous to the second cutting edge respectively.

5. The internal deburring chamfer tool as claimed in claim 4, wherein the lateral surface of the first rib is inclined to the first peripheral surface not greater than 90 degrees, and wherein the lateral surface of the second rib is inclined to the second peripheral surface not greater than 90 degrees.

6. The internal deburring chamfer tool as claimed in claim 3, wherein the working end has at least one third peripheral surface constituting the conical shape, wherein the working end has at least one third cutting edge and an edge of the at least one third peripheral surface defines the at least one third cutting edge, wherein the at least one third cutting edge slopes from a first end adjacent to the vertex of the conical shape to a second end adjacent to the base of the conical shape in a length longer than the second length, wherein the first indented surface separates at least one third and the second peripheral surfaces as well as the at least one third and the second cutting edges, and wherein the second cutting edge is situated between the first and the at least one third cutting edges circumferentially.

7. The internal deburring chamfer tool as claimed in claim 6, wherein the working end has at least one fourth peripheral surfaces constituting the conical shape, wherein the working end has at least one fourth cutting edge and an edge of the at least one fourth peripheral surface defines the at least one fourth cutting edge, wherein the at least one fourth cutting edge slopes from a first end adjacent to the vertex of the conical shape to a second end adjacent to the base of the conical shape in a length less than the length of the at least one third cutting edge, wherein the at least one third and the at least one fourth cutting edges are alternatively situated circumferentially, and wherein the working end has a second indented surface separating the at least one third and the at least one fourth peripheral surfaces as well as the at least one third and the at least one fourth cutting edges.

8. The internal deburring chamfer tool as claimed in claim 7, wherein the first and the at least one third cutting edges are of the same length, and wherein the second and the at least one fourth cutting edges are of the same length.

9. The deburring chamfer tool as claimed in claim 8, wherein the main body includes a connecting end adapted to be connected to a driving tool.

10. The internal deburring chamfer tool as claimed in claim 7, wherein the working end has at least one third rib and a surface of the at least one third rib defines the at least one third peripheral surface, wherein the at least one third rib has a lateral surface inclined to the at least one third peripheral surface, wherein the working end has at least one fourth rib and a surface of the at least one fourth rib defines the at least one fourth peripheral surface, wherein the at least one fourth rib has a lateral surface inclined to the at least one fourth peripheral surface, and wherein the at least one third rib includes the lateral surface thereof contiguous to the at least one third cutting edge and the at least one fourth rib includes the lateral surface thereof contiguous to the at least one fourth cutting edge respectively.

11. The internal deburring chamfer tool as claimed in claim 7, wherein the first, the second, the at least one third, and the at least one fourth cutting edges extend linearly.

12. The internal deburring chamfer tool as claimed in claim 7, wherein the first, the second, the at least one third, and the at least one fourth cutting edges extend curvedly.

13. The internal deburring chamfer tool as claimed in claim 6, wherein the first and the at least one third cutting edges are of the same length.

14. The internal deburring chamfer tool as claimed in claim 13, wherein the main body includes a connecting end adapted to be connected to a driving tool.

15. The internal deburring chamfer tool as claimed in claim 6, wherein the working end has at least one third rib and a surface of the at least one third rib defines the at least one third peripheral surface, wherein the at least one third rib has a lateral surface inclined to the at least one third peripheral surface, and wherein the at least one third rib includes the lateral surface thereof contiguous to the at least one third cutting edge.

16. The internal deburring chamfer tool as claimed in claim 15, wherein the lateral surface of the at least one third rib is inclined to the at least one third peripheral surface not greater than 90 degrees.

17. The internal deburring chamfer tool as claimed in claim 15, wherein the lateral surface of the at least one third rib is inclined to the at least one third peripheral surface not greater than 90 degrees, and wherein the lateral surface of the at least one fourth rib is inclined to the at least one fourth peripheral surface not greater than 90 degrees.

18. The internal deburring chamfer tool as claimed in claim 1, wherein the main body includes a connecting end adapted to be connected to a driving tool.

19. The internal deburring chamfer tool as claimed in claim 1, wherein the first and the second cutting edges extend linearly.

20. The internal deburring chamfer tool as claimed in claim 1, wherein the first and the second cutting edges extend curvedly.

* * * * *